United States Patent
Fujii et al.

(10) Patent No.: US 10,556,818 B2
(45) Date of Patent: Feb. 11, 2020

(54) CURVED SURFACE COVER GLASS, METHOD FOR MANUFACTURING SAME, AND IN-VEHICLE DISPLAY MEMBER

(71) Applicant: AGC Inc., Chiyoda-ku (JP)

(72) Inventors: Makoto Fujii, Tokyo (JP); Kenichi Masuda, Tokyo (JP); Satoshi Kanasugi, Tokyo (JP); Naoki Hashitani, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 15/665,463

(22) Filed: Aug. 1, 2017

(65) Prior Publication Data

US 2017/0327402 A1 Nov. 16, 2017

Related U.S. Application Data

(63) Continuation of application No. PCT/JP2016/052772, filed on Jan. 29, 2016.

(30) Foreign Application Priority Data

Feb. 5, 2015 (JP) .................. 2015-021070

(51) Int. Cl.
*C03B 23/02* (2006.01)
*C03C 21/00* (2006.01)
(Continued)

(52) U.S. Cl.
CPC ........ *C03B 23/023* (2013.01); *C03B 23/0013* (2013.01); *C03B 23/035* (2013.01);
(Continued)

(58) Field of Classification Search
None
See application file for complete search history.

(56) References Cited

U.S. PATENT DOCUMENTS 3,753,840 A * 8/1973 Plumat ................ C03B 23/0305
428/174
2012/0247063 A1* 10/2012 Grzybowski ....... E06B 3/66304
52/786.13
(Continued)

FOREIGN PATENT DOCUMENTS

CN 101172767 A 5/2008
DE 10 2010 020 439 A1 11/2011
(Continued)

OTHER PUBLICATIONS

International Search Report dated Apr. 5, 2016 in PCT/JP2016/052772, filed on Jan. 29, 2016 ( with English Translation).

*Primary Examiner* — David Sample
(74) *Attorney, Agent, or Firm* — Oblon, McClelland, Maier & Neustadt, L.L.P.

(57) ABSTRACT

A plate-like glass includes a chemically strengthened glass having a first surface, a second surface facing the first surface, and an end surface connecting the first surface and second surface. When a tangential direction from an arbitrary point on the first surface is assumed to be an X-axis, a direction orthogonal to the X-axis is assumed to be a Y-axis, and a direction orthogonal to the X-axis and the Y-axis is assumed to be a Z-axis, the X-axis is a direction in which a first curvature radius $R_1$ in cross-section of the first surface in an XZ plane passing the X-axis and Z-axis is minimum. The first surface has a curvature part in which the surface is bent in the X-axis direction on the first surface and the first curvature radius $R_1$ is within a specific range.

28 Claims, 8 Drawing Sheets

(51) Int. Cl.
*C03B 23/035* (2006.01)
*C03B 23/023* (2006.01)
*C03B 23/00* (2006.01)
*C03C 3/085* (2006.01)
*C03C 3/091* (2006.01)
*G02B 27/01* (2006.01)

(52) U.S. Cl.
CPC .............. *C03C 3/085* (2013.01); *C03C 3/091* (2013.01); *C03C 21/002* (2013.01); *G02B 2027/011* (2013.01)

(56) References Cited

U.S. PATENT DOCUMENTS

| | | |
|---|---|---|
| 2013/0034670 A1 | 2/2013 | Hashimoto et al. |
| 2013/0086948 A1* | 4/2013 | Bisson ................ C03B 23/0258 65/106 |
| 2013/0295357 A1* | 11/2013 | Cleary .............. B32B 17/10036 428/215 |
| 2013/0298608 A1 | 11/2013 | Langsdorf et al. |
| 2013/0323415 A1* | 12/2013 | Brackley ................ B41M 5/007 427/171 |
| 2013/0337224 A1 | 12/2013 | Odani et al. |
| 2014/0011000 A1 | 1/2014 | Dunkmann et al. |
| 2014/0218804 A1 | 8/2014 | Tanahashi |
| 2015/0175473 A1 | 6/2015 | Yamamoto et al. |
| 2015/0368140 A1* | 12/2015 | Ikemoto .............. C03B 23/0307 428/174 |

FOREIGN PATENT DOCUMENTS

| | | |
|---|---|---|
| JP | 2004-299199 | 10/2004 |
| JP | 2007-99557 | 4/2007 |
| JP | 2013-218161 | 10/2013 |
| JP | 2014-504229 | 2/2014 |
| WO | WO 2011/118524 A1 | 9/2011 |
| WO | WO2013/024539 | 2/2013 |
| WO | WO 2014/042175 A1 | 3/2014 |
| WO | WO 2014/167894 A1 | 10/2014 |

\* cited by examiner

CURVED SURFACE COVER GLASS, METHOD FOR MANUFACTURING SAME, AND IN-VEHICLE DISPLAY MEMBER

CROSS-REFERENCE TO RELATED APPLICATIONS

This application is a continuation of PCT/JP2016/052772, which was filed on Jan. 29, 2016. This application is based upon and claims the benefit of priority to Japanese Application No. 2015-021070, which was filed on Feb. 5, 2015.

TECHNICAL FIELD

The present invention relates to a curved cover glass, a method for manufacturing the same, and an in-vehicle display member.

BACKGROUND ART

An in-vehicle display member such as instrument panel or HUD (Head-Up Display) is sometimes internally mounted within an automobile so as to display a variety of information required during driving. For this in-vehicle member, FPD (Flat Panel Display) like a liquid crystal display or an organic EL display is used.

Since high design property or high strength is required of the in-vehicle display member, a protective cover is disposed in front of a screen of FPD used as an in-vehicle display member.

In a personal digital assistant typified by a mobile phone, etc., an acrylic resin plate with excellent transparency was used in early days as a protective plate of FPD like a liquid crystal display or an organic EL display (see, Patent Document 1).

However, in the case of an acrylic resin plate, the plate must have a large thickness so as to ensure the necessary strength. In addition, when the plate is used over a long period of time, the acrylic resin is deteriorated to impair the transparency.

Accordingly, a strengthened glass plate is being used as a protective plate (cover glass) of FPD like a liquid crystal display or an organic EL display (see, Patent Documents 2 and 3).

In the case of such a personal digital assistant, the strengthened glass plate used as a protective plate of FPD is a flat plate, and the screen is a flat surface.

However, when the screen of an in-vehicle display member intended to display a variety of information required during driving is a flat surface, the viewing angle for the driver extends in the transverse direction and/or the longitudinal direction, and therefore, the driver must move the eyes widely in the transverse direction and/or the longitudinal direction, resulting in poor visibility.

On the other hand, Patent Document 4 discloses a bent windowpane used as a motor vehicle windshield. However, when this bent windowpane is used as a cover glass of FPD employed for an in-vehicle display member, there is a problem in the following points.

In the case of a motor vehicle windshield, a physically strengthened glass or a laminated glass is used so as to ensure the necessary strength. However, a physically strengthened glass or a laminated glass has a large thickness and is therefore not suitable for a cover glass of FPD used as an in-vehicle display member. When such a physically strengthened glass or laminated glass is thinned to a thickness utilized in a cover glass of FPD used for the in-vehicle display member, the glass becomes a thin plate compared with the motor vehicle windshield, causing reduction in the mechanical strength.

PRIOR ART LITERATURE

Patent Document

Patent Document 1: JP-A-2004-299199
Patent Document 2: JP-A-2007-99557
Patent Document 3: WO-A1-2011-118524
Patent Document 4: JP-A-2014-504229

SUMMARY OF THE INVENTION

Technical Problems

In order to solve the problems of those conventional techniques, an object of the present invention is to provide a curved cover glass, a method for manufacturing the same, and an in-vehicle display member, ensuring that visibility of an in-vehicle display member can be enhanced.

Solution to Problems

In order to achieve the above object, the present invention provides a curved cover glass including a plate-like glass body having:
 a first surface;
 a second surface facing the first surface; and
 at least one end face connecting the first surface and the second surface,
 the plate-like glass body having been chemically strengthened, wherein:
 when a tangential direction from an arbitrary point on the first surface is assumed to be an X-axis, and among tangential directions from the center of the first surface, a direction orthogonal to the X-axis is assumed to be a Y-axis, and a direction orthogonal to the X-axis and the Y-axis is assumed to be a Z-axis,
 the X-axis is, among tangential directions on the first surface at an arbitrary point on the first surface, a direction in which a first curvature radius $R_1$ in cross-section of the first surface in an XZ plane passing the X-axis and the Z-axis is minimum,
 the first surface has a curvature part in which the surface is bent in the X-axis direction at least at one point on the first surface and the first curvature radius $R_1$ is from 300 to 10,000 mm, and
 on the first surface, the number of a specific curvature part having a curvature radius of less than 300 mm is 10 or less per unit area of 1 $mm^2$.

In addition, in order to achieve the above object, the present invention provides a curved cover glass including a plate-like glass body having:
 a first surface;
 a second surface facing the first surface; and
 at least one end face connecting the first surface and the second surface,
 the plate-like glass body including a chemically strengthened glass, wherein:
 when any of tangential directions at an arbitrary point on the first surface is assumed to be an X-axis, and among tangential directions on the first surface at the arbitrary point, a direction orthogonal to the X-axis is assumed to be a Y-axis, and a direction orthogonal to the X-axis and the Y-axis is assumed to be a Z-axis, the X-axis is, among tangential directions on the first surface at an arbitrary point on the first surface, a direction in which a first curvature radius $R_1$ in cross-section of the first surface in an XZ plane passing the X-axis and the Z-axis is minimum, the first surface has a curvature part in which the surface is bent in the X-axis direction at least at one point on the first surface and the first curvature radius $R_1$ is from 300 to 10,000 mm, and on the first surface, the number of a specific curvature part having a curvature radius of less than 300 mm is 10 or less per unit area of 1 $mm^2$.

In addition, the first surface may have the curvature part at least at one arbitrary point in a portion adjacent to the end face or at one arbitrary point within 100 mm from the end face.

In addition, the first surface may be bent in the Y-axis direction at least at one point in the curvature part, and a second curvature radius $R_2$ in cross-section of the first surface of the plate-like glass body in a YZ plane passing the Y-axis and the Z-axis may be from 300 to 10,000 mm.

In addition, a second curvature radius $R_2$ in cross-section of the first surface of the plate-like glass body in a YZ plane passing the Y-axis and the Z-axis may be from 300 to 10,000 mm at least at one arbitrary point in the first surface in a portion adjacent to the end face or at one arbitrary point in the first surface within 100 mm from the end face.

In addition, an average thickness $t_{ave}$ of the plate-like glass body constituting the curved cover glass may be 2 mm or less.

In addition, a ratio $t_{max}/t_{min}$ between a maximum value $t_{max}$ of the thickness in the curvature part and a minimum value $t_{min}$ of the thickness in the curvature part may be from 1.0 to 1.5.

In addition, a maximum length in a two-dimensional projected dimension of the first surface may be 50 mm or more and 100 mm or less.

In addition, a maximum value of a surface compressive stress in the first surface may be 600 MPa or more.

In addition, the first surface may be a concave surface.

In addition, in order to achieve the above object, the present invention provides a method for manufacturing the curved cover glass, wherein the curved cover glass is formed by a vacuum forming method.

In addition, in order to achieve the above object, the present invention provides an in-vehicle display member, wherein the curved cover glass is disposed on a screen of a display member by arranging the second surface to face the screen.

In addition, the screen of the display member and the second surface of the curved cover glass may be bonded.

In addition, the display member may be a panel display, and the display member may be a flat panel display (FPD).

Advantageous Effects of the Invention

In the present invention, in the case of using the curved cover glass as a cover glass of an in-vehicle display member, the portion disposed on the screen of the display member is appropriately bent, and therefore, the viewing angle for the driver becomes small, so that the visibility of the in-vehicle display member can be enhanced.

In addition, in the present invention, the curved cover glass is chemically strengthened, and therefore, even when the curved cover glass is used as a cover glass of an in-vehicle display member, sufficient strength is obtained.

DESCRIPTION OF EMBODIMENTS

Several embodiments of the curved cover glass of the present invention and the in-vehicle display member of the present invention are described below. However, the curved cover glass of the present invention and the in-vehicle display member of the present invention are not limited to these embodiments.

Figure 1:
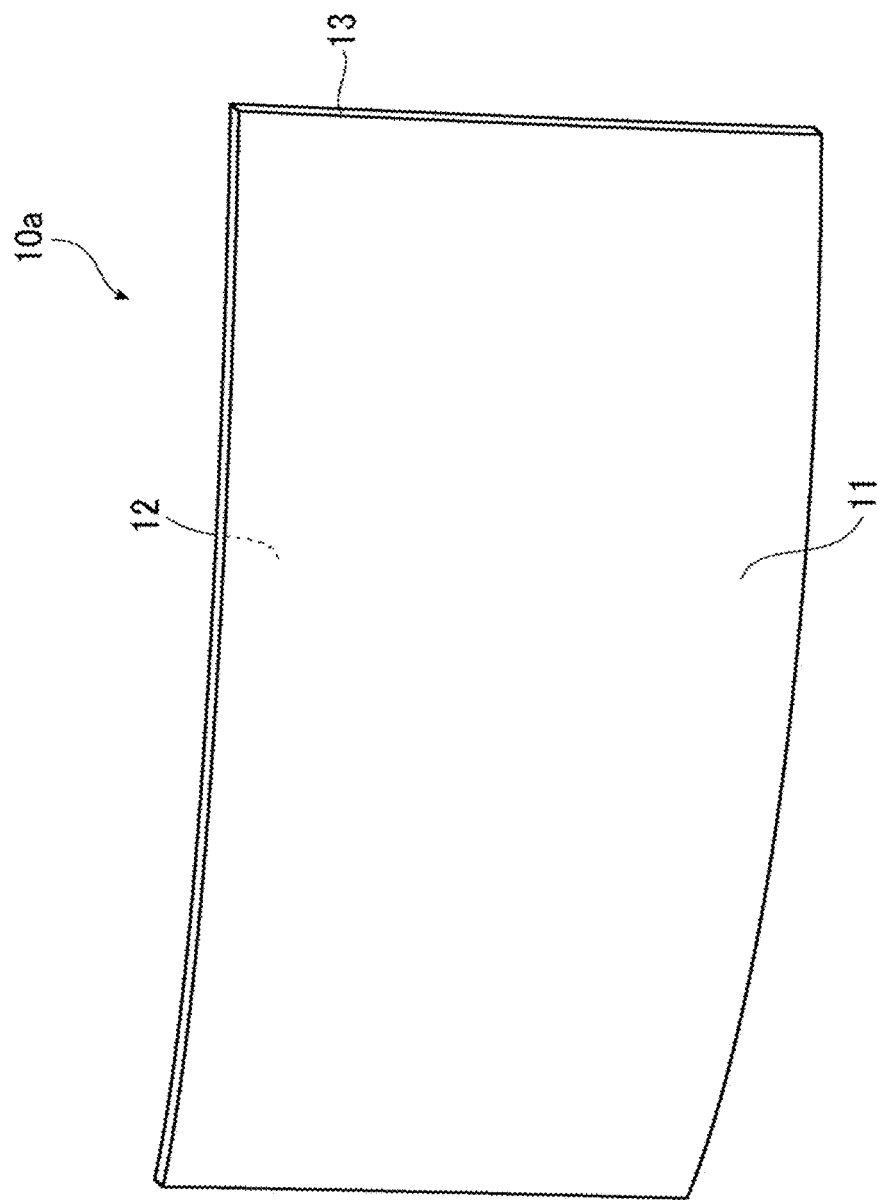
FIG. 1 A perspective view of a curved cover glass for explaining the curved cover glass of the present embodiment.

FIG. 1 is a perspective view of a curved cover glass for explaining the curved cover glass of the present embodiment. As illustrated in FIG. 1, the curved cover glass of the present embodiment is composed of a plate-like glass body 10a having a first surface 11, a second surface 12 facing the first surface 11, and at least one end face 13 connecting the first surface 11 and the second surface 12. The plate-like glass body 10a as used in the present description means a plate-like body in which the dimensions of the first surface 11 and the second surface 12 are large compared to the thickness of the end face 13, but does not mean a planar sheet glass. The plate-like glass body constituting the curved cover glass of the present embodiment has a curvature part as described later.

Out of two main surfaces of the plate-like glass body, which main surface should be taken as the first or second surface is not particularly limited, but in the case of use as a cover glass of an in-vehicle display member, the surface on the externally exposed side, i.e., the surface on the side working out to a screen, is taken as the first surface of the plate-like glass body. In this case, the surface facing the screen of an in-vehicle display member is the second surface of the plate-like glass body, and the screen of the in-vehicle display member and the second surface of the plate-like glass body are bonded.

Figure 2:
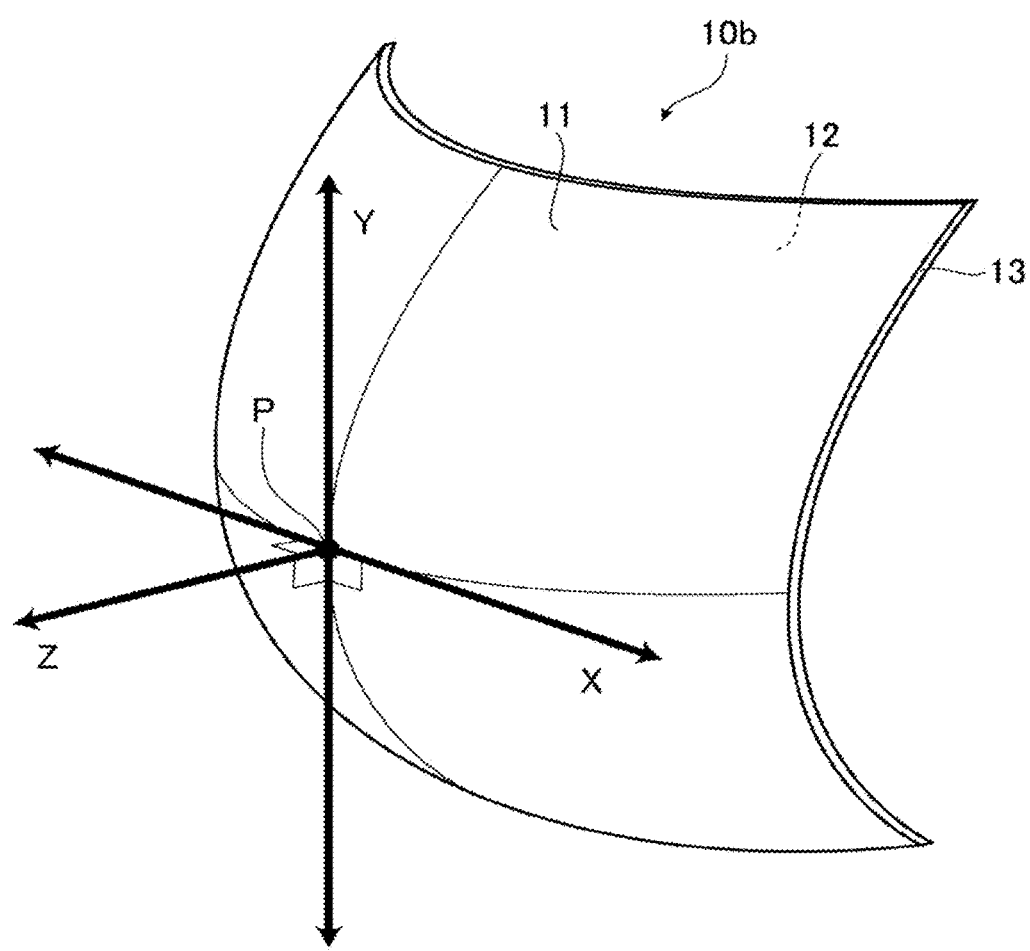
FIG. 2 A schematic explanatory view for explaining the curvature part in the present invention.

FIG. 2 is a schematic explanatory view for explaining the curvature part in the present invention and illustrates a curved cover glass. The curved cover glass illustrated in FIG. 2 is composed of a plate-like glass body 10b having a first surface 11, a second surface 12 facing the first surface 11, and at least one end face 13 connecting the first surface 11 and the second surface 12. In the present invention, in order to specify the later-described curvature part, among tangential directions on the first surface at an arbitrary point P on the first surface 11 of the plate-like glass body constituting the curved cover glass, a tangential direction selected so as to satisfy the following conditions is assumed to be an X-axis, and among tangential directions on the first surface at the point P on the first surface, a direction orthogonal to the X-axis is assumed to be a Y-axis, and a direction orthogonal to the X-axis and the Y-axis is assumed to be a Z-axis. However, the X-axis, the Y-axis and the Z-axis are axes in a mutually intersecting relationship. Here, the X-axis is, among tangential directions on the first surface at the arbitrary point P on the first surface of the plate-like glass body, a direction in which the curvature radius (hereinafter, sometimes referred to as first curvature radius) $R_1$ in cross-section of the first surface of the plate-like glass body in an XZ plane passing the X-axis and the Z-axis is minimum. In the case of having a plurality of directions in which $R_1$ is minimum, the first curvature radius $R_1$ may be determined by taking at least one of those directions as the X-axis. In this case, the first curvature radius $R_1$ is preferably determined by taking, as the X-axis, a direction in which the later-described second curvature radius $R_2$ is minimum.

The first surface of the plate-like glass body constituting the curved cover glass has a curvature part in which the surface is bent in the X-axis direction at least at one point on the first surface. The curvature part indicates a region in which the first curvature radius $R_1$ in the XZ plane at an arbitrary point P on the first surface is from 300 to 10,000 mm. In FIG. 2, the entire first surface 11 forms a curvature part.

In the case of having a curvature part in which the first curvature radius $R_1$ is from 300 to 10,000 mm, when the cover glass is used as a cover glass of an in-vehicle display member, since the portion disposed on the screen of the display member is appropriately bent, the viewing angle for the driver becomes small and in turn, the visibility of the in-vehicle display member is enhanced.

From the viewpoint of enhancing the visibility of the in-vehicle display member, the first curvature radius $R_1$ of the curvature part is preferably from 400 to 2,500 mm, more preferably from 500 to 1,000 mm.

As illustrated in FIG. 2, the surface in the curvature part of the plate-like glass body constituting the curved cover glass may be bent also in the Y-axis direction at least at one point in the curvature part. In this case, the curvature radius (hereinafter, sometimes referred to as second curvature radius) $R_2$ in cross-section of the first surface of the plate-like glass body in the YZ plane passing the Y-axis and the Z-axis is not particularly limited but is preferably from 300 to 10,000 mm, more preferably from 400 to 2,500 mm, still more preferably from 500 to 1,000 mm. As described above, out of tangential directions on the first surface at an arbitrary point P on the first surface of the plate-like glass body, a direction in which the first curvature radius $R_1$ is minimum is taken as the X-axis and therefore, the first curvature radius $R_1$ and the second curvature radius $R_2$ satisfy the relation of $R_1 \leq R_2$.

The arbitrary point P above is an arbitrary point in the curvature part on the first surface of the plate-like glass body and, for example, in the case where the central region of the first surface is a curvature part, the arbitrary point may be the center position (e.g., the position of the center of gravity of the plate-like glass body) of the first surface. In other words, the X-axis and the Y-axis may be a tangential direction from the center of the first surface, and the Z-axis may be a normal direction at the center of the first surface.

FIGS. 3 to 6 are each a perspective view illustrating a configuration example of the curved cover glass of the present embodiment. The curved cover glass illustrated in FIG. 3 to FIG. 6 is composed of a plate-like glass body 10c to 10f having a first surface 11, a second surface 12 facing the first surface 11, and at least one end face 13 connecting the first surface 11 and the second surface 12. In FIGS. 3 to 6, similarly to FIG. 2, an arbitrary point P on the first surface 11 of each of the plate-like glass bodies 10c to 10f and an X-axis, a Y-axis and Z determined by the point P are illustrated. In the plate-like glass bodies 10c to 10f illustrated in FIGS. 3 to 6, the entire first surface 11 forms a curvature part. In the curved cover glass illustrated in FIG. 3, the dimension of the plate-like glass body 10c constituting the curved cover glass is 600 mm×250 mm×2 mm (thickness). The first surface 11 of the plate-like glass body 10c constituting the curved cover glass is a concave surface denting toward the second surface 12 side and is bent only in the X-axis direction defined above, where the first curvature radius $R_1$ is 500 mm. In the curved cover glass illustrated in FIG. 4, the dimension of the plate-like glass body 10d constituting the curved cover glass is 600 mm×250 mm×2 mm (thickness). The first surface 11 of the plate-like glass body 10d constituting the curved cover glass is a convex surface and is bent only in the X-axis direction defined above, where the first curvature radius $R_1$ is 500 mm. In the curved cover glass illustrated in FIG. 5, the dimension of the plate-like glass body 10e constituting the curved cover glass is 600 mm×250 mm×2 mm (thickness). The first surface 11 of the plate-like glass body 10e constituting the curved cover glass is a convex surface and is bent in the X-axis and Y-axis directions defined above, where the first curvature radius $R_1$ is 500 mm and the second curvature radius $R_2$ is 1,500 mm. In the curved cover glass illustrated in FIG. 6, the dimension of the plate-like glass body 10f constituting the curved cover glass is 600 mm×250 mm×2 mm (thickness). The first surface 11 of the plate-like glass body 10f constituting the curved cover glass is in a convex shape protruding along the X direction toward the opposite side of the second surface 12 and in a concave shape denting along the Y direction toward the second surface 12 side and is bent in the X-axis and Y-axis directions defined above, where the first curvature radius $R_1$ is 500 mm and the second curvature radius $R_2$ is 1,500 mm.

Figure 3:
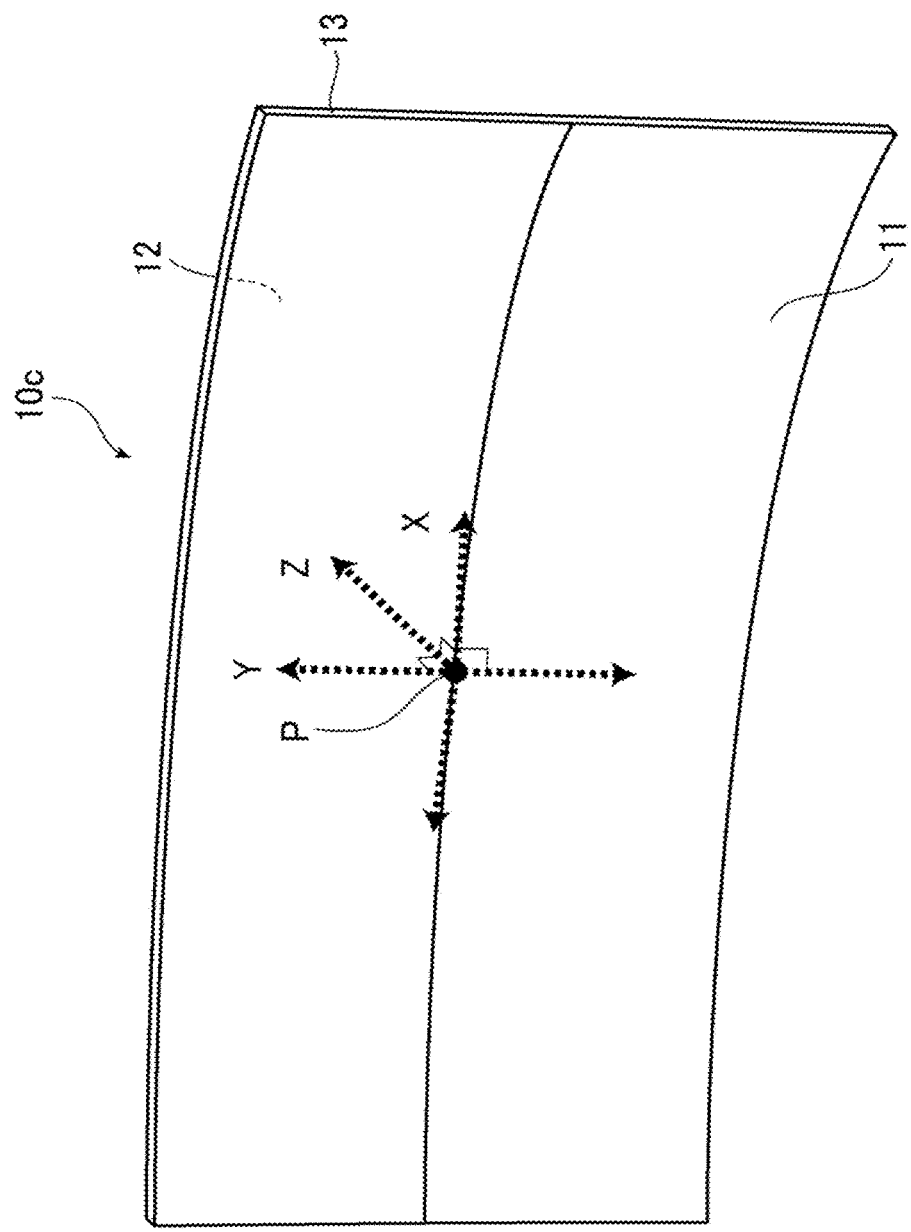
FIG. 3 A perspective view illustrating one configuration example of the curved cover glass of the present embodiment.
Figure 4:
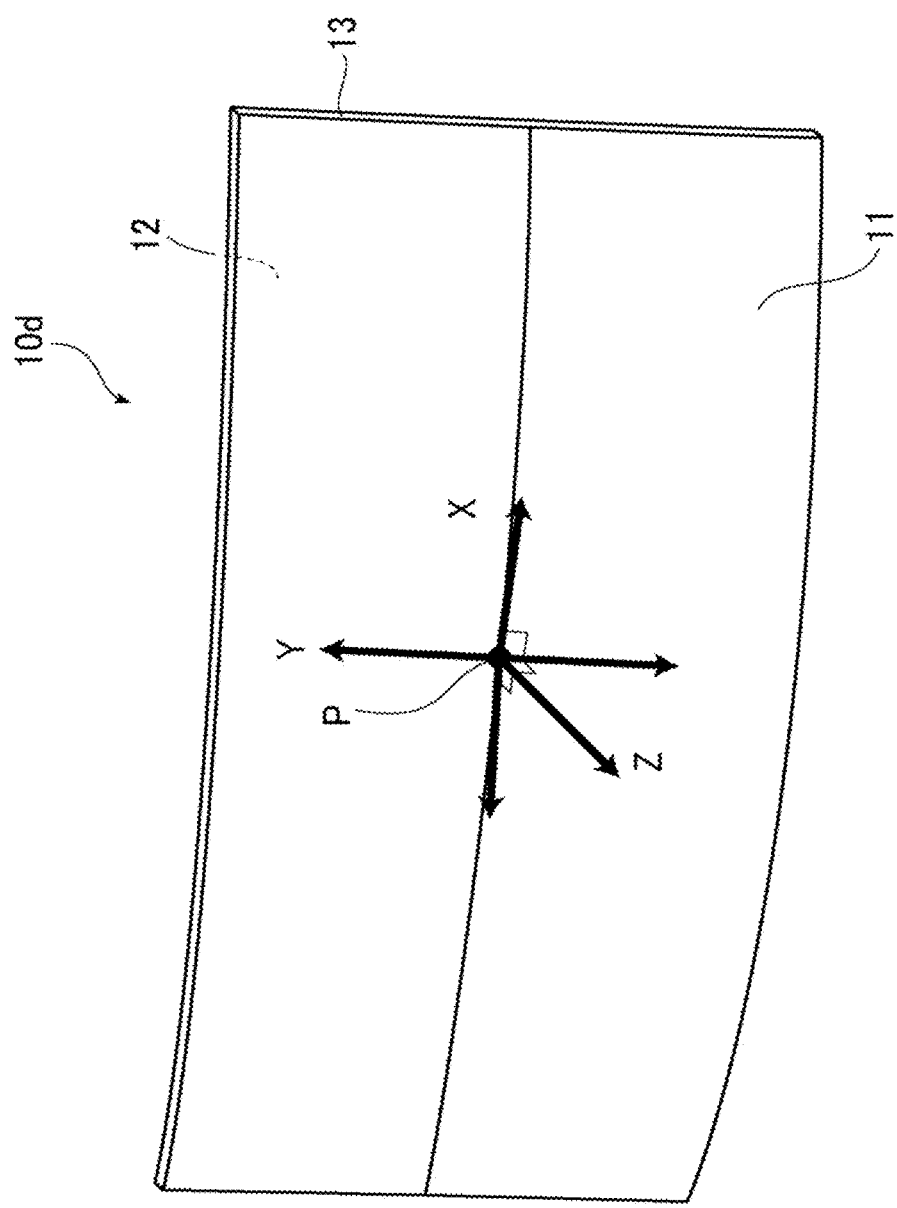
FIG. 4 A perspective view illustrating another configuration example of the curved cover glass of the present embodiment.
Figure 5:
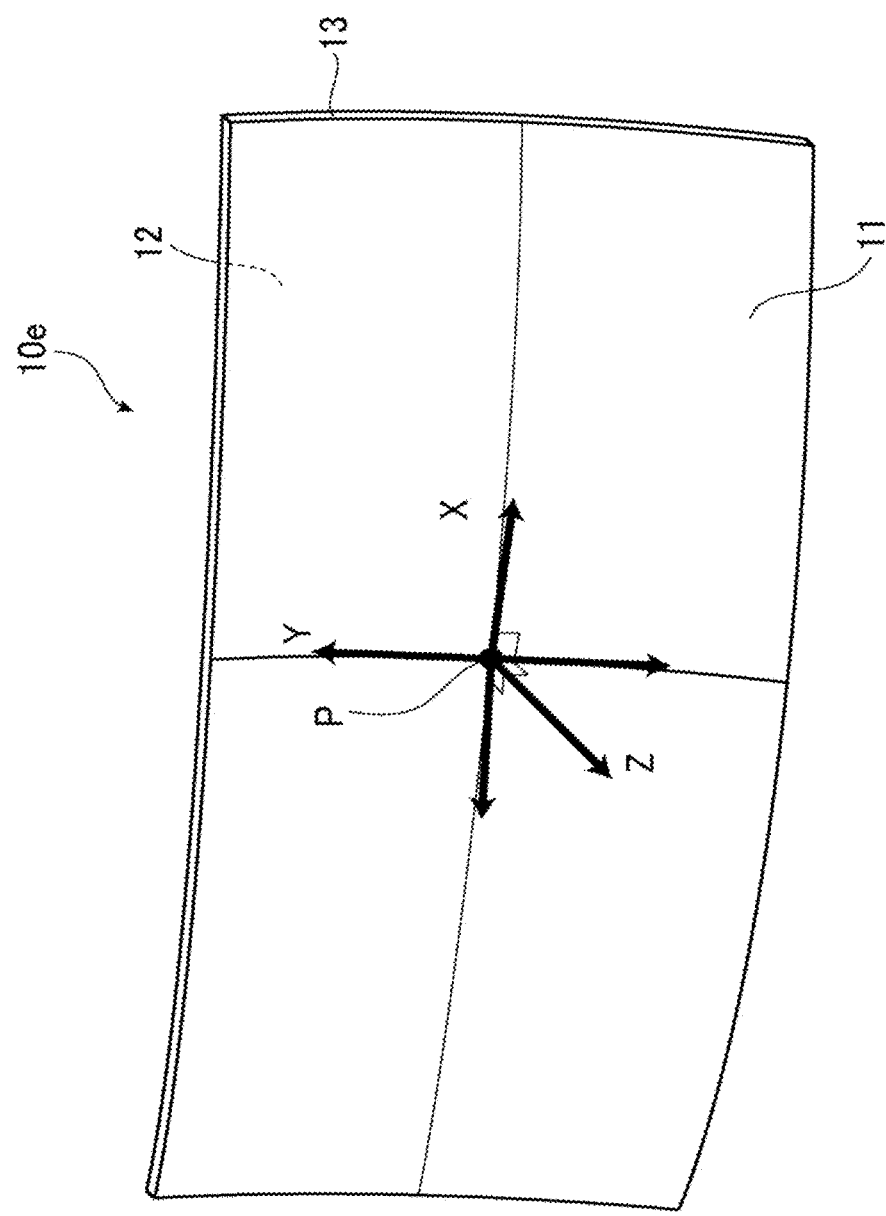
FIG. 5 A perspective view illustrating still another configuration example of the curved cover glass of the present embodiment.

The curved cover glass of the present embodiment is sufficient if the first surface of the plate-like glass body constituting the curved cover glass has the curvature part defined above, and the first surface of the plate-like glass body constituting the curved over glass may be a concave surface as in the curved cover glass illustrated in FIG. 3, or the first surface of the plate-like glass body constituting the curved cover glass may be a convex surface as in the curved cover glass illustrated in FIG. 4 and FIG. 5. In addition, as in the curved cover glass illustrated in FIG. 6, the first surface of the plate-like glass body constituting the curved cover glass may be a composite curved surface having a convex shape in one direction (for example, in the X-axis direction) and a concave shape in another direction (for example, in the Y-axis direction).

Figure 6:
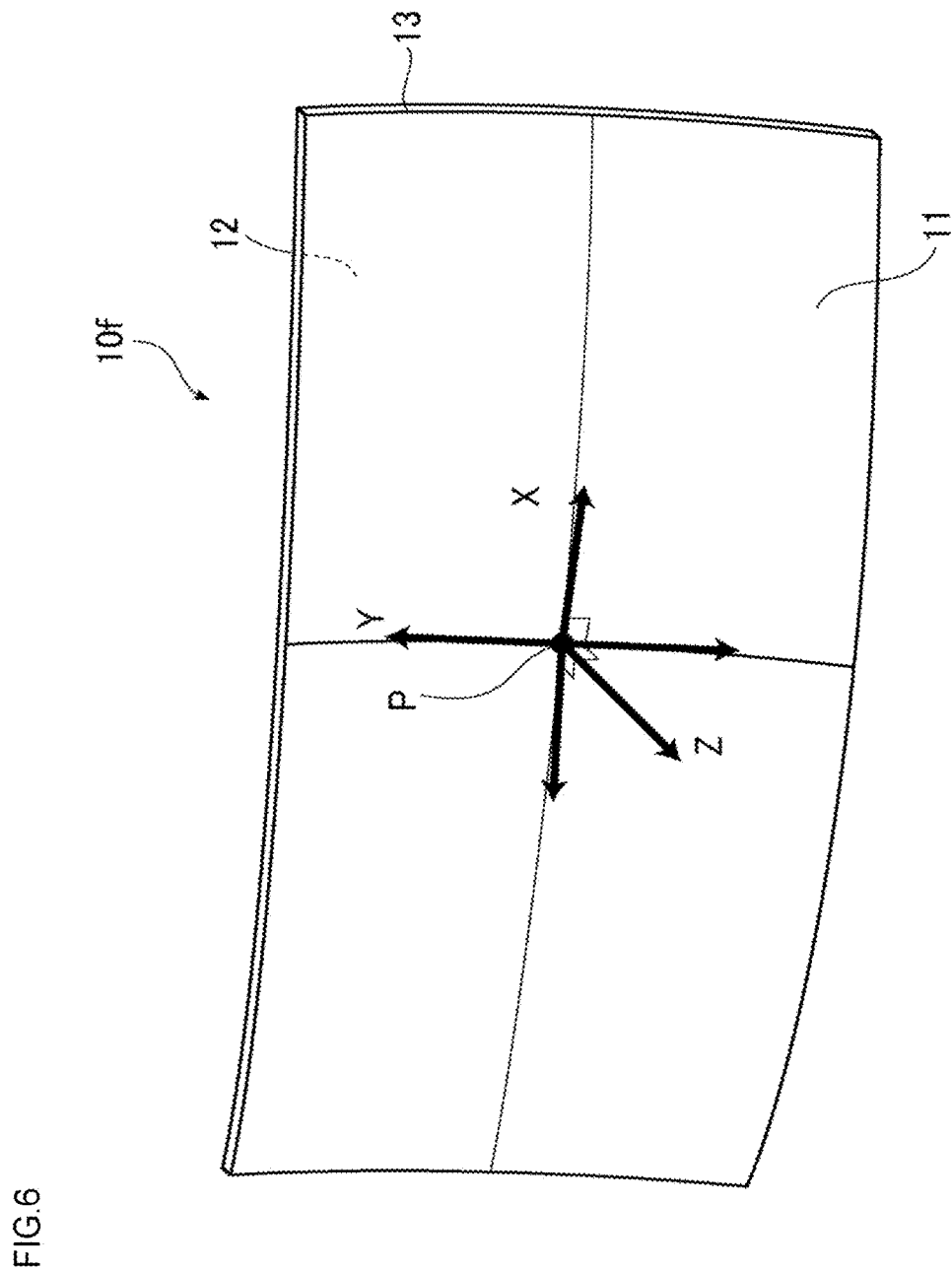
FIG. 6 A perspective view illustrating yet still another configuration example of the curved cover glass of the present embodiment.

As described above, the curved cover glass of the present embodiment may have a shape of being curved in a single direction as illustrated in FIGS. 1, 3 and 4, may have a bottomed bowl shape as illustrated in FIGS. 2 and 5, may have a saddle shape as illustrated in FIG. 6, and furthermore, may have a curved shape in which an inflection point is present in a plurality of places, such as corrugated or concentric shape. That is, as long as the plate-like glass body is a plate-like glass body having a curvature part, the curved cover glass of the present embodiment can employ an arbitrary curved surface shape. From the viewpoint of enhancing the visibility of an in-vehicle display member, it is preferred that the first surface working out to a screen when used as a cover glass of an in-vehicle display member is a concave surface.

In the curved cover glasses illustrated in FIGS. 3 to 6, the entire first surface 11 of the plate-like glass body 10c, 10d, 10e or 10f constituting the curved cover glass is bent, and the entire first surface 11 is composed of a curvature part, but the configuration is not limited thereto, and a part of the first surface may be a curvature part.

In the present description, a portion having a first curvature radius $R_1$ of more than 10,000 mm is referred to as a non-bent, substantially flat part, and a portion having a curvature radius of less than 300 mm is referred to as a specific curvature part. The plate-like glass body constituting the curved cover glass may have such a substantially flat part or a specific curvature part. A portion allowing a concave-convex defect such as (fine) wave, scratch or dent having a curvature radius of less than 300 mm to be present in the glass surface comes under the specific curvature part. In the curved cover glass of the present embodiment, the number of the specific curvature parts is 10 or less per unit area of 1 mm$^2$ on the first surface of the plate-like glass body constituting the curved cover glass. When the number of the specific curvature parts is 10 or less per unit area of 1 mm$^2$, the visibility is not affected. A specific curvature part in which the area occupied by a portion having a curvature radius of less than 300 mm is 1 µm$^2$ or less is not counted as one specific curvature part, because such a part can be hardly confirmed by an optical microscope and moreover, does not affect the visibility.

From the viewpoint of enhancing the visibility, the plate-like glass body constituting the curved cover glass preferably has a curvature part at least at one arbitrary point in the first surface in a portion adjacent to the end face or at one arbitrary point in the first surface within 100 mm from the end face, so as to enhance the visibility of an in-vehicle display member. The former is a case where the curvature part on the first surface is connected to the end face, and the latter is a case where the curvature part on the first surface is not connected to the end face. In the latter, a substantially flat part or a specific curvature part is present between the curvature part on the first surface and the end face. In the latter case, it is more preferable to have a curvature part at one arbitrary point within 50 mm from the end face, and it is still more preferable to have a curvature part at one arbitrary point within 30 mm from the end face.

In the case where the surface in the curvature part of the plate-like glass body constituting the curved cover glass is bent also in the Y-axis direction, from the viewpoint of enhancing the visibility, the plate-like glass body constituting the curved cover glass preferably has a second curvature radius $R_2$ of 300 to 10,000 mm at least at one or more points in the first surface in a portion adjacent to the end face or at one or more points in the first surface within 100 mm from the end face. The former is a case where the curvature part on the first surface is connected to the end face, and the latter is a case where the curvature part on the first surface is not connected to the end face. In the latter, a substantially flat part or a specific curvature part is present between the curvature part on the first surface and the end face. In the latter case, it is more preferred that the second curvature radius $R_2$ is from 300 to 10,000 mm at one arbitrary point within 50 mm from the end face, and it is still more preferred that the second curvature radius $R_2$ is from 300 to 10,000 mm at one arbitrary point within 300 mm from the end face.

In the curved cover glass of the present embodiment, the thickness t of the plate-like glass body constituting the curved cover glass is preferably small for the following reasons.

Figure 7:
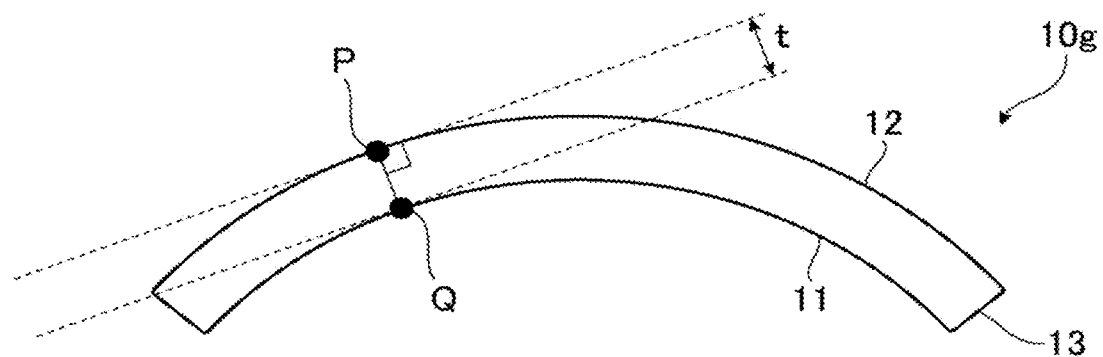
FIG. 7 An explanatory view for explaining the thickness of a plate-like glass body constituting the curved cover glass.

First, reduction in the thickness t leads to decrease in the mass of the curved cover glass. In addition, the absorbancy in the thickness direction of the curved cover glass is proportional to the thickness t. Accordingly, reduction in the thickness t makes it possible to decrease the absorbancy and increase the visible light transmittance in the thickness direction of the curved cover glass and in turn, the visibility is enhanced. FIG. 7 is an explanatory view for explaining the thickness t of a plate-like glass body constituting the curved cover glass. The plate-like glass body 10g illustrated in FIG. 7 has a first surface 11, a second surface 12 facing the first surface 11, and at least one end face 13 connecting the first surface 11 and the second surface 12.

In the present description, as illustrated in FIG. 7, the thickness t of the plate-like glass body at an arbitrary point Q on the first surface is defined as a shortest distance connecting an arbitrary point Q on the first surface 11 and an intersection point P of a normal line to the first surface 11 at the point Q and the second surface of the plate-like glass body.

More specifically, the average thickness $t_{ave}$ of the plate-like glass body constituting the curved cover glass is 3 mm or less, preferably 2 mm or less, more preferably 1.5 mm or less, still more preferably 1 mm or less, yet still more preferably 0.7 mm or less. When the average thickness $t_{ave}$ of the plate-like glass body is 3 mm or less, a chemical strengthening treatment can be effectively conducted, and weight reduction can be achieved. In addition, when the average thickness $t_{ave}$ of the plate-like glass body is 2 mm or less, in the case of using the curved cover glass of the present embodiment for a touch panel, excellent sensitivity is obtained. The lower limit is not particularly limited but is 0.1 mm, preferably 0.2 mm, more preferably 0.3 mm, still more preferably 0.4 mm, yet still more preferably 0.5 mm. When the average thickness $t_{ave}$ of the plate-like glass body is 0.1 mm or more, excellent strength is obtained.

The curved cover glass of the present embodiment preferably exhibits less variation in the thickness t in the curvature part of the plate-like glass body constituting the curved cover glass, because variation of the transmittance, etc. of the plate-like glass body is suppressed and the visibility is enhanced.

More specifically, the ratio $t_{max}/t_{min}$ between the maximum value $t_{max}$ of the thickness in the curvature part of the plate-like glass body and the minimum value $t_{min}$ of the thickness in the curvature part of the plate-like glass body is preferably from 1.0 to 1.5, more preferably from 1.0 to 1.1.

In the curved cover glass of the present embodiment, the maximum length in a two-dimensional projected dimension of the first surface of a plate-like glass body constituting the curved cover glass is preferably 50 mm or more and 1,000 mm or less, because the effect of enhancing the visibility due to providing a curvature part becomes prominent, and the maximum length is more preferably 200 mm or more and 700 mm or less, still more preferably 300 mm or more and 600 mm or less. Here, the maximum length in a two-dimensional projected dimension indicates a maximum straight line length out of straight lines connecting arbitrary two points on the contour of a plan view having the largest area among plan views obtained by projecting the first surface of a plate-like glass body constituting the curved cover glass onto a two-dimensional plane from an arbitrary direction. When the maximum length in a two-dimensional projected dimension is 50 mm or more and 1,000 mm or less, the two-dimensional projected dimension is not too small for use as an in-vehicle display member, and the viewing angle for the driver does not excessively extend in the transverse direction and/or the longitudinal direction.

In the curved cover glass of the present embodiment, in order to ensure mechanical strength and scratch resistance required as a cover glass of an in-vehicle display member, the plate-like glass body constituting the curved cover glass is chemically strengthened. In the plate-like glass body that is a chemically strengthened glass, due to chemical strengthening, a compressive stress layer is formed in the surface, and the strength and scratch resistance are thereby increased. Chemical strengthening is a treatment conducted at a temperature equal to or less than a glass transition temperature for forming a compressive stress layer in a glass surface by replacing an alkali metal ion (typically, Li ion or Na ion) having a smaller ionic radius in the glass surface with an alkali metal ion (typically, K ion) having a larger ionic radius by way of ion exchange. The chemical strengthening treatment can be conducted by a well-known method.

The glass composition of the plate-like glass body constituting the curved cover glass is not particularly limited as long as a chemical strengthening treatment is possible, and examples thereof include, for example, soda lime silicate glass, aluminosilicate glass, borate glass, lithium aluminosilicate glass, and borosilicate glass.

In the plate-like glass body constituting the curved cover glass, the total of the contents of $Li_2O$ and $Na_2O$ in the glass composition is preferably 12 mol % or more so as to appropriately perform the chemical strengthening treatment. In addition, for the reason that as the content of $Li_2O$ in the glass composition increases, the glass transition point lowers and forming is facilitated, the content of $Li_2O$ is preferably set to be 0.5 mol % or more, more preferably 1.0 mol % or more, still more preferably 2.0 mol % or more. Furthermore, in order to increase the surface compressive stress (Compressive Stress: CS) and the depth of compressive stress layer (Depth of Layer: DOL), the glass composition of the plate-like glass body preferably contains 60 mol % or more of $SiO_2$ and 8 mol % or more of $Al_2O_3$. Here, in the plate-like glass body constituting the curved cover glass, the maximum value of the surface compressive stress in the first surface is preferably 600 MPa or more, and the depth of the compressive stress layer is preferably 10 μm or more. When the surface compressive stress and depth of compressive stress layer fall within the ranges above, excellent strength and scratch resistance are obtained.

Specific examples of the glass composition of the plate-like glass body constituting the curved cover glass include a glass containing, as a composition represented by mol %, from 50 to 80% of $SiO_2$, from 0.1 to 25% of $Al_2O_3$, from 3 to 30% of $Li_2O+Na_2O+K_2O$, from 0 to 25% of MgO, from 0 to 25% of CaO, and from 0 to 5% of $ZrO_2$, but the glass composition is not particularly limited thereto. More specifically, examples of the glass composition include the following glass compositions. Here, for example, the phrase "containing from 0 to 25% of MgO" means that MgO is not essential but may be contained up to 25%. The glass of (i) is encompassed by soda lime silicate glass, and the glasses of (ii) and (iii) are encompassed by aluminosilicate glass.

(i) A glass containing, as a composition represented by mol %, from 63 to 73% of $SiO_2$, from 0.1 to 5.2% of $Al_2O_3$, from 10 to 16% of $Na_2O$, from 0 to 1.5% of $K_2O$, from 0 to 5.0% of $Li_2O$, from 5 to 13% of MgO, and from 4 to 10% of CaO.

(ii) A glass containing, as a composition represented by mol %, from 50 to 74% of $SiO_2$, from 1 to 10% of $Al_2O_3$, from 6 to 14% of $Na_2O$, from 3 to 11% of $K_2O$, from 0 to 5.0% of $Li_2O$, from 2 to 15% of MgO, from 0 to 6% of CaO, and from 0 to 5% of $ZrO_2$, wherein the total of the contents of $SiO_2$ and $Al_2O_3$ is 75% or less, the total of the contents of $Na_2O$ and $K_2O$ is from 12 to 25%, and the total of the contents of MgO and CaO is from 7 to 15%.

(iii) A glass containing, as a composition represented by mol %, from 68 to 80% of $SiO_2$, from 4 to 10% of $Al_2O_3$, from 5 to 15% of $Na_2O$, from 0 to 1% of $K_2O$, from 0 to 5.0% of $Li_2O$, from 4 to 15% of MgO, and from 0 to 1% of $ZrO_2$.

(iv) A glass containing, as a composition represented by mol %, from 67 to 75% of $SiO_2$, from 0 to 4% of $Al_2O_3$, from 7 to 15% of $Na_2O$, from 1 to 9% of $K_2O$, from 0 to 5.0% of $Li_2O$, from 6 to 14% of MgO, and from 0 to 1.5% of $ZrO_2$, wherein the total of the contents of $SiO_2$ and $Al_2O_3$ is from 71 to 75%, the total of the contents of $Na_2O$ and $K_2O$ is from 12 to 20%, and in the case of containing CaO, the content thereof is less than 1%.

In the present embodiment, the plate-like glass body constituting the curved cover glass is preferably formed into a predetermined shape from planar sheet glass. As to the forming method used, a desired forming method may be selected from a gravity forming method, a vacuum forming method, and a press forming method, depending on the shape of the plate-like glass body after forming.

The gravity forming method is a method of placing sheet glass on a predetermined mold appropriate to the shape of the plate-like glass body after forming, softening the sheet glass, and bending the sheet glass by gravity to fit in with the mold, thereby forming into a predetermined shape.

The vacuum forming method is a method of applying a differential pressure to front and back surfaces of sheet glass in the state of the sheet glass being softened, and bending the sheet glass to fit in with the mold, thereby forming into a predetermined shape. In the vacuum forming method, sheet glass is placed on a predetermined mold appropriate to the shape of the plate-like glass body after forming, a clamping mold is placed on the sheet glass, the periphery of the sheet glass is sealed, and the space between the mold and the sheet glass is then depressurized by a pump to apply a differential pressure to front and back surfaces of the sheet glass. At this time, the top surface side of the sheet glass may be pressurized supplementarily.

The press forming method is a method of placing sheet glass between predetermined molds (upper mold and lower mold) appropriate to the shape of the plate-like glass body after forming, applying a pressing load between upper and lower molds in the state of the sheet glass being softened, and bending the sheet glass to fit in with the mold, thereby forming into a predetermined shape.

Among others, a vacuum forming method is particularly preferred as the method for forming a plate-like glass body constituting the curved cover glass into a predetermined shape. According to the vacuum forming method, forming can be performed while keeping one main surface out of two facing main surfaces of the plate-like glass body from contacting with the forming mold, and a concave-convex defect such as scratch and dent can thereby be reduced. The main surface on the side not coming into contact with the forming mold is used as the first surface, and the number of specific curvature parts on the first surface can thereby be reduced to 10 or less per unit area of 1 mm$^2$, which is preferred from the viewpoint of enhancing the visibility.

Two or more kinds of forming methods may be used in combination, depending on the shape of the plate-like glass body after forming.

In the plate-like glass body constituting the curved cover glass, various functional layers may be formed, if desired, on the first surface of the plate-like glass body working out to the screen when used as a cover glass of an in-vehicle display member. Specific examples of the functional layer include an antiglare layer, an antireflection layer, and an antifouling layer, and the functional layer is not particularly limited thereto and may be sufficient if a function can be imparted to the plate-like glass body. Such a functional layer is provided at least in a curvature part in the first surface of the plate-like glass body.

In the case where an antiglare layer is formed on the first surface of the plate-like glass body, the haze in the curvature part on the first surface is 50% or less, preferably 40% or less, more preferably 30% or less, still more preferably 20% or less. When the haze is 50% or less, reduction in the contrast can be sufficiently suppressed. As to the method for forming an antiglare layer, a known method can be utilized, and the antiglare layer may be formed, for example, by wet coating such as spraying method using a liquid raw material or by etching of glass.

In the case where an antifouling layer is formed on the first surface of the plate-like glass body, the static friction coefficient in the curvature part on the first surface is preferably 1.0 or less, more preferably 0.9 or less, still more preferably 0.8 or less. When the static friction coefficient is 1.0 or less, good finger slipperiness is exhibited at the time of touching the curvature part on the first surface with a human finger. The dynamic friction coefficient in the curvature part on the first surface is preferably 0.02 or less, more preferably 0.015 or less, still preferably 0.01 or less. When the dynamic friction coefficient is 0.02 or less, good finger slipperiness is exhibited at the time of touching the curvature part on the first surface with a human finger.

As other functional layers, for example, an antibacterial layer containing silver, titanium oxide, etc. and an antifogging layer for preventing fogging may be selected. The functional layer may also be a printing layer for increasing the hiding property.

Various functional layers such as antiglare layer and antireflection layer may take on a configuration where the layer is formed inside the plate-like glass body (the inner side in the thickness direction from the surface), other than a configuration where the layer is formed on the surface of the plate-like glass body, and may also take on a configuration where the plate-like glass body as a whole functions as the functional layer. Furthermore, the functional layer may be formed on the entire surface of glass or may be formed in part, for example, in frame shape at the outer edge, and the configuration is not particularly limited thereto.

In the in-vehicle display member of the present embodiment, the curved cover glass of the present embodiment is disposed on a screen of the display member. Here, the curved cover glass is disposed such that the second surface of the plate-like glass body constituting the curved cover glass faces the screen of the display member, and the screen of the display member and the second surface of the plate-like glass body constituting the curved cover glass are preferably bonded through an adhesive. As for the adhesive, a conventionally known adhesive may be used, but an adhesive having an average light transmittance of 95% or more at wavelength of 400 to 800 nm is preferred.

Examples of the display member include a flat panel display (FPD) such as liquid crystal display, organic EL display and plasma display, a projection mapping, electronic paper, etc. In particular, the curved cover glass of the present embodiment is suitable for a display member to be curved (panel display), such as organic EL display. The display member is mounted to fit with the shape of the curved cover glass, whereby the visibility for a viewer can be enhanced.

In the in-vehicle display member of the present embodiment, from the viewpoint of enhancing the visibility, the shape of the screen of the display member preferably conforms to the shape of the second surface of the plate-like glass body constituting the curved cover glass. Above all, in the case where the screen of the display member is bonded to the second surface of the plate-like glass body constituting the curved cover glass, the shapes of both preferably conform to each other, because the thickness of the adhesive becomes uniform on the second surface and the visibility is more enhanced.

In the curved cover glass of the present embodiment, as described above, the thickness t of the plate-like glass body constituting the curved cover glass is small and in turn, the difference between the curvature radius (first curvature radius $R_1$, second curvature radius $R_2$) in the curvature part on the first surface and the curvature radius on the second surface facing the first surface is small. Accordingly, the curvature radius (first curvature radius $R_1$, second curvature radius $R_2$) in the curvature part on the first surface of the plate-like glass body constituting the curved cover glass can provide an indicator for judging whether the shape of the screen of the display member conforms to the shape of the second surface of the plate-like glass body constituting the curved cover glass. The absolute value of the difference between the first curvature radius $R_1$ at an arbitrary point Q in the curvature part on the first surface of the plate-like glass body constituting the curved cover glass and the curvature radius in the same direction as the first curvature radius $R_1$ at the point facing the point Q in a portion on the screen of the display member is preferably 10% or less of the first curvature radius $R_1$, more preferably 5% or less of the first curvature radius $R_1$, still more preferably 3% or less of the first curvature radius $R_1$.

EXAMPLES

First, sheet glass (product name: Dragontrail (registered trademark), manufactured by Asahi Glass Co., Ltd., 650 mm×220 mm×average thickness $t_{ave}$ 2.0 mm) was formed by a vacuum forming method, thereby obtaining a curved cover glass. After softening the sheet glass by heating until reaching 720° C., a differential pressure was applied to front and back surfaces of the sheet glass, and the sheet glass was bent to fit in with the mold, thereby forming into a predetermined shape.

Figure 8:
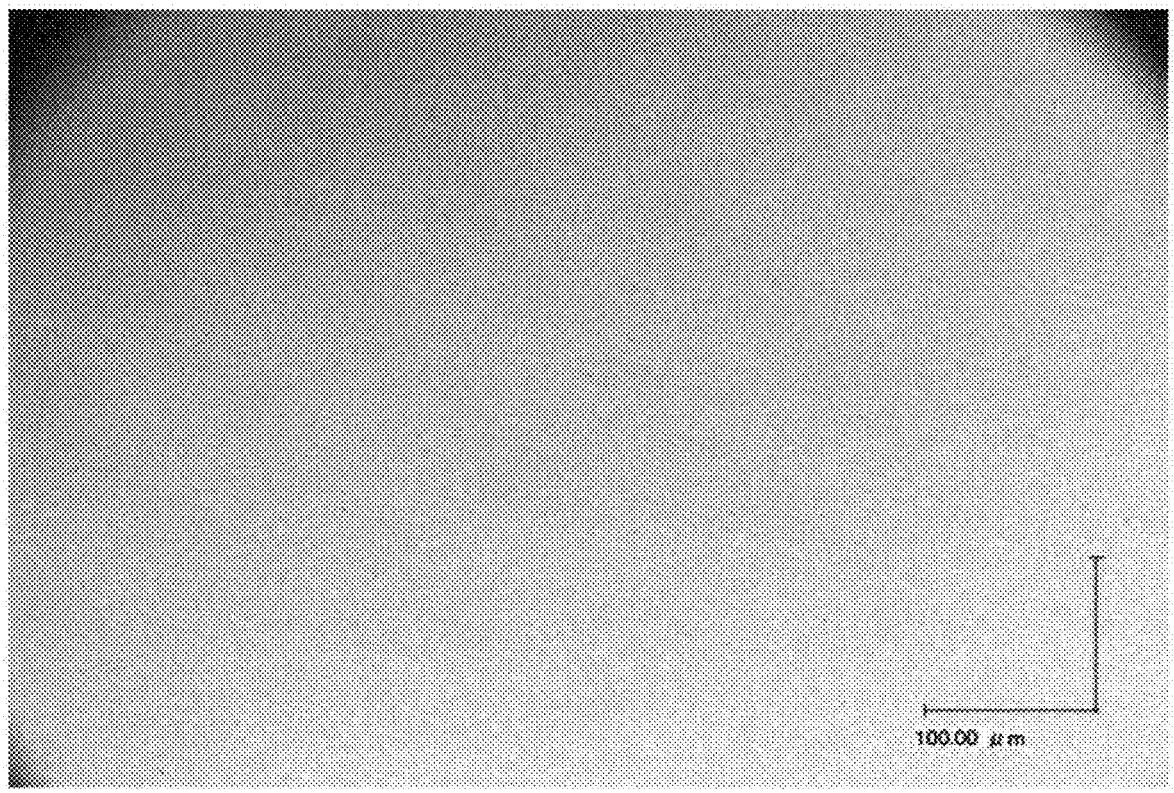
FIG. 8 An optical micrograph (magnification: 450 times) of the first surface of the curved cover glass in Example.

Next, at a point with a first curvature radius $R_1$ of 1,000 mm and a second curvature radius $R_2$ of 10,000 mm on the first surface of the obtained curved cover glass, the first surface was observed by an optical microscope. A digital microscope (VHX-600, manufactured by Keyence Corporation) was used as the optical microscope. The first surface is a surface not contacted with the mold during vacuum forming. FIG. 8 illustrates a photograph of the first surface observed. The magnification is 450 times. The number of specific curvature parts in the observation region on the first surface was 1 per unit area of 1 mm², and no effect was exerted on the visibility.

Figure 9:
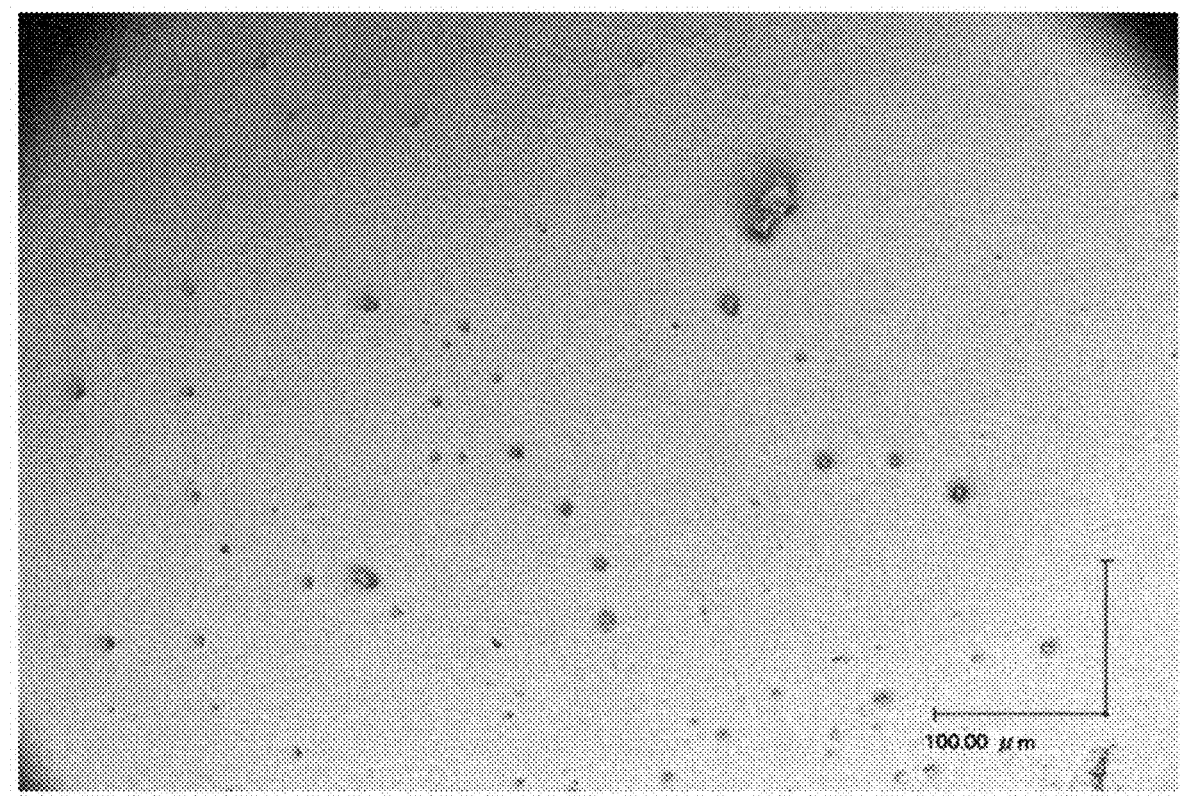
FIG. 9 An optical micrograph (magnification: 450 times) of the first surface of the curved cover glass in Comparative Example.

Subsequently, at a point on the second surface facing the point on the first surface observed in FIG. 8 of the obtained curved cover glass, the second surface was observed in the same manner by the optical microscope. The second surface is a surface contacted with the mold during vacuum forming. FIG. 9 illustrates a photograph of the second surface observed. The number of specific curvature parts in the observation region on the second surface was about 30 per unit area of 1 mm², and the visibility was deteriorated.

This application is based on Japanese Patent Application No. 2015-21070 filed on Feb. 5, 2015, the contents of which are incorporated herein by way of reference.

DESCRIPTION OF REFERENCE NUMERALS AND SIGNS 10a, 10b, 10c, 10d, 10e, 10f: Plate-like glass body
11: First surface
12: Second surface
13: End face

The invention claimed is:

1. A curved cover glass, comprising a plate-like glass body having:
    a first surface;
    a second surface facing the first surface; and
    at least one end face connecting the first surface and the second surface,
    wherein:
    the plate-like glass body has been chemically strengthened; and
    when a tangential direction from an arbitrary point on the first surface is defined to be X-axis, and among tangential directions from a center of the first surface, a direction orthogonal to the X-axis is defined to be Y-axis, and a direction orthogonal to the X-axis and the Y-axis is defined to be Z-axis:
        the X-axis is, among tangential directions on the first surface at an arbitrary point on the first surface, a direction in which a first curvature radius $R_1$ in cross-section of the first surface in an XZ plane passing the X-axis and the Z-axis is minimum,
        the first surface has a curvature part in which the surface is bent in the X-axis direction at least at one point on the first surface and the first curvature radius $R_1$ is from 300 to 10,000 mm, and
        on the first surface, the number of a specific curvature part having a curvature radius of less than 300 mm is 10 or less per unit area of 1 mm².

2. The curved cover glass according to claim 1, wherein the first surface has the curvature part at least at one arbitrary point in a portion adjacent to the end face or at one arbitrary point within 100 mm from the end face.

3. The curved cover glass according to claim 1, wherein:
    the first surface is bent in the Y-axis direction at least at one point in the curvature part; and
    a second curvature radius $R_2$ in cross-section of the first surface of the plate-like glass body in a YZ plane passing the Y-axis and the Z-axis is from 300 to 10,000 mm.

4. The curved cover glass according to claim 1, wherein a second curvature radius $R_2$ in cross-section of the first surface of the plate-like glass body in a YZ plane passing the Y-axis and the Z-axis is from 300 to 10,000 mm at least at one arbitrary point in the first surface in a portion adjacent to the end face or at one arbitrary point in the first surface within 100 mm from the end face.

5. The curved cover glass according to claim 1, wherein an average thickness $t_{ave}$ of the plate-like glass body constituting the curved cover glass is 2 mm or less.

6. The curved cover glass according to claim 5, wherein a ratio $t_{max}/t_{min}$ between a maximum value $t_{max}$ of the thickness in the curvature part and a minimum value $t_{min}$ of the thickness in the curvature part is from 1.0 to 1.5.

7. The curved cover glass according to claim 1, wherein a maximum length in a two-dimensional projected dimension of the first surface is 50 mm or more and 100 mm or less.

8. The curved cover glass according to claim 1, wherein a maximum value of a surface compressive stress in the first surface is 600 MPa or more.

9. The curved cover glass according to claim 1, wherein the first surface is a concave surface.

10. A method for manufacturing the curved cover glass according to claim 1, the method comprising forming the curved cover glass by a vacuum forming method.

11. An in-vehicle display member, comprising the curved cover glass according to claim 1 disposed on a screen of a display member by arranging the second surface to face the screen.

12. The in-vehicle display member according to claim 11, wherein the screen of the display member and the second surface of the curved cover glass are bonded.

13. The in-vehicle display member according to claim 11, wherein the display member is a panel display.

14. The in-vehicle display member according to claim 11, wherein the display member is a flat panel display.

15. A curved cover glass, comprising a plate-like glass body having:
    a first surface;
    a second surface facing the first surface; and
    at least one end face connecting the first surface and the second surface,
    wherein:
    the plate-like glass body comprises a chemically strengthened glass; and
    when any of tangential directions at an arbitrary point on the first surface is defined to be X-axis, and among tangential directions on the first surface at the arbitrary point, a direction orthogonal to the X-axis is defined to be Y-axis, and a direction orthogonal to the X-axis and the Y-axis is defined to be Z-axis:
        the X-axis is, among tangential directions on the first surface at an arbitrary point on the first surface, a direction in which a first curvature radius $R_1$ in cross-section of the first surface in an XZ plane passing the X-axis and the Z-axis is minimum,
        the first surface has a curvature part in which the surface is bent in the X-axis direction at least at one point on the first surface and the first curvature radius $R_1$ is from 300 to 10,000 mm, and
        on the first surface, the number of a specific curvature part having a curvature radius of less than 300 mm is 10 or less per unit area of 1 mm².

16. The curved cover glass according to claim 15, wherein the first surface has the curvature part at least at one arbitrary point in a portion adjacent to the end face or at one arbitrary point within 100 mm from the end face.

17. The curved cover glass according to claim 15, wherein:
    the first surface is bent in the Y-axis direction at least at one point in the curvature part; and a second curvature radius $R_2$ in cross-section of the first surface of the plate-like glass body in a YZ plane passing the Y-axis and the Z-axis is from 300 to 10,000 mm.

18. The curved cover glass according to claim 15, wherein a second curvature radius $R_2$ in cross-section of the first surface of the plate-like glass body in a YZ plane passing the Y-axis and the Z-axis is from 300 to 10,000 mm at least at one arbitrary point in the first surface in a portion adjacent to the end face or at one arbitrary point in the first surface within 100 mm from the end face.

19. The curved cover glass according to claim 15, wherein an average thickness $t_{ave}$ of the plate-like glass body constituting the curved cover glass is 2 mm or less.

20. The curved cover glass according to claim 19, wherein a ratio $t_{max}/t_{min}$ between a maximum value $t_{max}$ of the thickness in the curvature part and a minimum value $t_{min}$ of the thickness in the curvature part is from 1.0 to 1.5.

21. The curved cover glass according to claim 15, wherein a maximum length in a two-dimensional projected dimension of the first surface is 50 mm or more and 100 mm or less.

22. The curved cover glass according to claim 15, wherein a maximum value of a surface compressive stress in the first surface is 600 MPa or more.

23. The curved cover glass according to claim 15, wherein the first surface is a concave surface.

24. A method for manufacturing the curved cover glass according to claim 15, the method comprising forming the curved cover glass by a vacuum forming method.

25. An in-vehicle display member, comprising the curved cover glass according to claim 15 disposed on a screen of a display member by arranging the second surface to face the screen.

26. The in-vehicle display member according to claim 25, wherein the screen of the display member and the second surface of the curved cover glass are bonded.

27. The in-vehicle display member according to claim 25, wherein the display member is a panel display.

28. The in-vehicle display member according to claim 25, wherein the display member is a flat panel display.

* * * * *